Patented Apr. 17, 1945

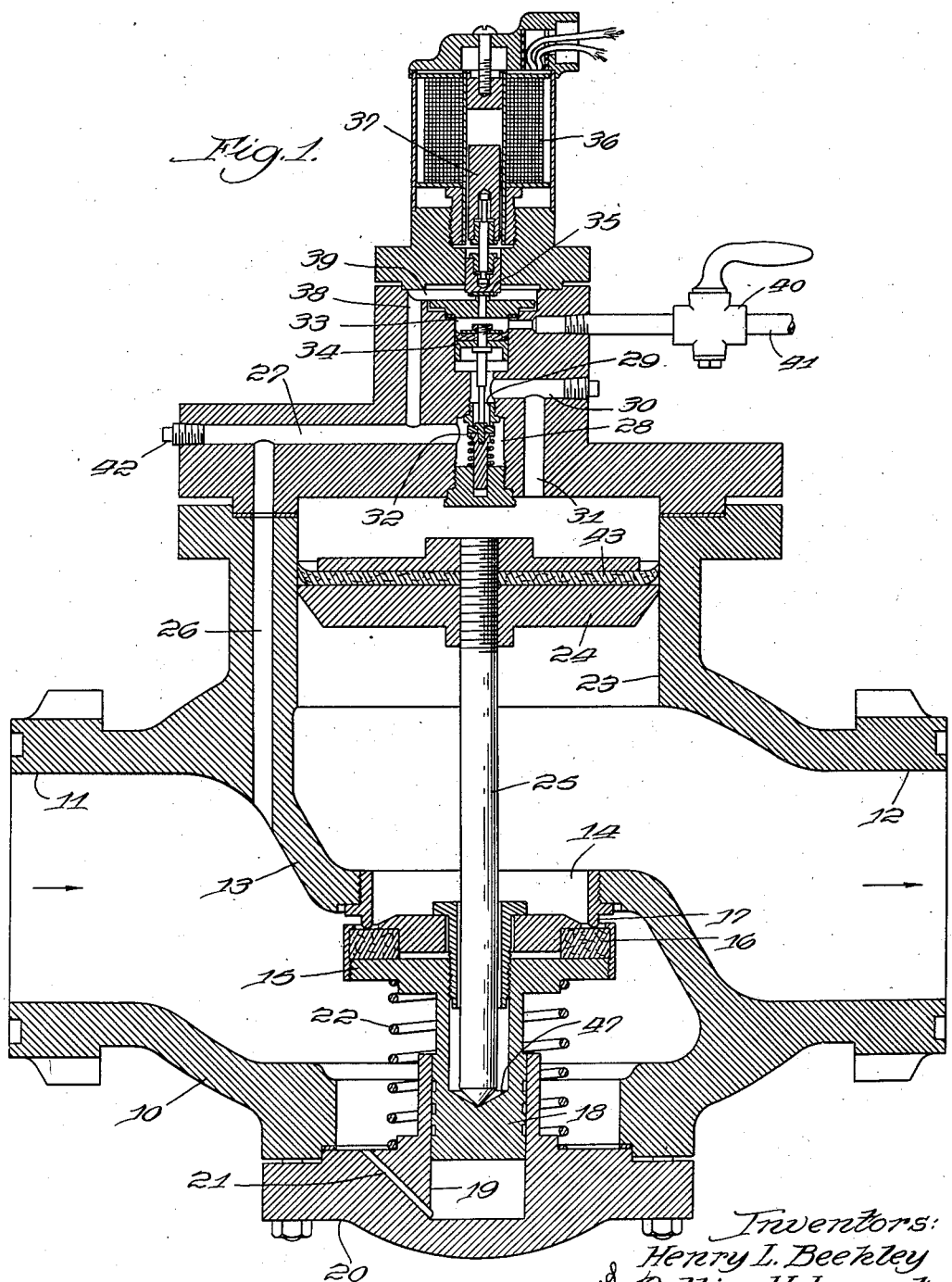

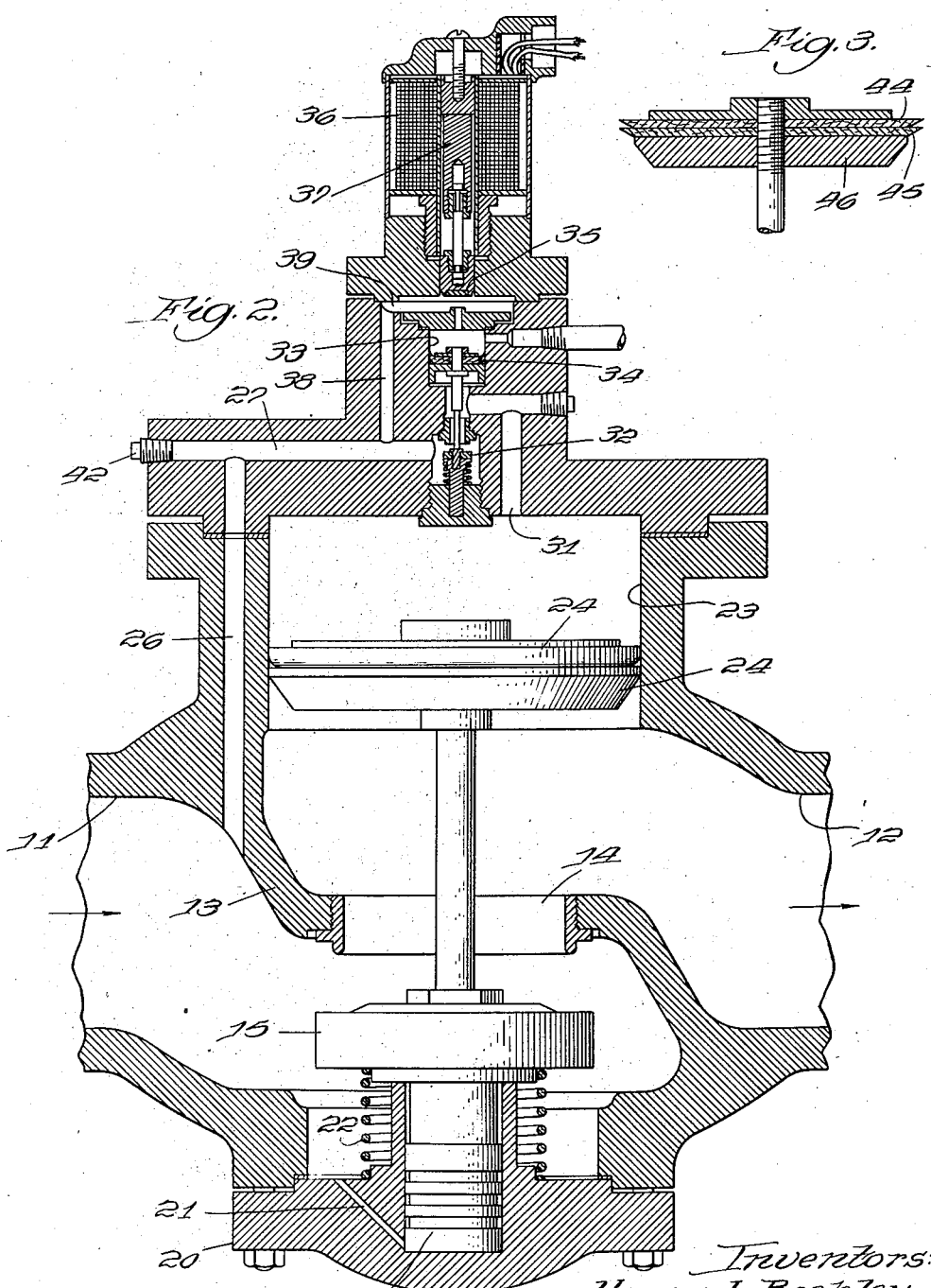

2,373,654

UNITED STATES PATENT OFFICE 2,373,654

VALVE

Henry L. Beckley, Glen Ellyn, and Rollin H. Lacart, Chicago, Ill., assignors to The Electrimatic Corporation, a corporation of Illinois Application June 8, 1942, Serial No. 446,196

2 Claims. (Cl. 137—139)

This invention relates to an improved valve, and more particularly to a valve adapted to control fluids at high pressure.

One feature of this invention is that it provides a valve particularly adapted for the control of high pressure gas, such as carbon dioxide, and for either automatic or manual operation; another feature of this invention is that the valve member and actuating mechanism are simplified in form; still another feature of this invention is that sticking or jamming of the actuating piston is completely eliminated; yet a further feature of this invention is the provision of what might be termed "three-point" alignment of the piston; other features and advantages of this invention will be apparent from the following specification and the drawings, in which:

Figure 1 is a vertical sectional view of a valve embodying our invention in a preferred form, with the valve member in closed position and the actuating and control elements in corresponding positions; Figure 2 is a similar view of the same valve with the valve member in open position and the actuating and control elements in corresponding positions; and Figure 3 is a view of a modified form of piston sealing arrangement.

There are many applications and systems where fluid at high pressure is normally restrained from flowing, and where initiation of flow is desired upon the happening of some particular occurrence, and it is for a system of this type that the particular valve here disclosed has been designed. One example of such a system is a "cardox" fire fighting and control system, as for example in connection with an engine testing chamber. In such systems carbon dioxide is stored at pressures of three hundred pounds per square inch or higher, usually at a temperature of about zero degrees Fahrenheit. If a connecting tube or any other part of the engine breaks under test and a fire starts it is desired to immediately flood the test chamber with a smothering flow of carbon dioxide gas. In most cases this release is automatic, as by a thermostat, but there may be cases where it is desired to effect the operation manually, and the valve disclosed here enables either type of operation.

Another form of valve for such a system has heretofore been developed and disclosed in an application by us and one Gilbert, which application is Serial No. 425,469, filed January 2, 1942. The present valve differs from the valve shown in such application primarily in the shape of the actuating piston and the way in which its movement is guided.

Referring first to Figure 1, it will be seen that a main casting or valve body 10 is provided with an inlet opening 11 and an outlet opening 12, these being adapted to be connected in any appropriate manner to inlet and outlet pipes. The inlet pipe, in a fire fighting system of the kind heretofore mentioned, would be connected to a source of carbon dioxide under high pressure, as a storage tank, and the outlet pipe would lead from the opening 12 to any desired discharge point or points, as one or more nozzles adapted to flood the test chamber with carbon dioxide gas immediately upon opening of the valve. The inlet and outlet of the valve are separated by a partition 13 having an opening 14 therethrough, a valve member being operatively associated with this opening to control fluid flow through it. The valve member is here shown as comprising a cup member 15 and a seating member or gasket 16 adapted to engage the annular seat 17 around the opening 14. The valve member is carried by a piston 18 slidable in a cylinder 19 in a cap 20 at the bottom of the valve, an orifice 21 acting as a restriction to the flow of liquid in or out of the cylinder 19, so that there is a dashpot action preventing undesirably rapid movement of the valve member. A spring 22 continuously urges the valve member to closed position, and under normal conditions maintains the valve member in such closed position, so that there is no flow through the valve. When such flow is desired, opening of the valve member may be effected by automatic means, as an electric circuit including a thermostat, or by manual means, as by the opening of a valve.

The actuating means for the valve member comprises as its principal parts an actuating cylinder 23, a piston 24 reciprocal therein, and a rod 25 having one end rigidly connected to the piston 24 and the other end movably connected to the valve member piston 18. When it is desired to open the valve member fluid under pressure is admitted to the actuating cylinder 23 above the piston 24 and this effects downward movement of the piston which in turn effects opening movement of the valve member, the open position of the parts being shown in Figure 2.

While the control means shown here is the same as that shown and described in our earlier application mentioned above, it will be briefly described here in order that the disclosure of this application may be complete. Fluid in the high pressure or inlet side of the valve is led through passages 26 and 27 to a chamber 28. An opening 29 is adapted to provide communication between this chamber, through passages 30 and 31, to the top of the actuating cylinder 23, such communication taking place only when the valve member 32 is in open position. This control valve is normally held in closed position by a spring, but is adapted to be moved to open position whenever pressure is present in the cylinder 33 above the piston 34.

Automatic opening of this control valve is effected through a pilot valve 35 and associated electrical control mechanism. A solenoid 36 is adapted to be energized in any desired manner, as by the closing of a thermostat, and when energized it lifts a plunger 37 which in turn raises the pilot valve 35 from its seat and admits fluid under pressure in the passage 27 to the top of the control cylinder 33, the fluid flowing through the passageways 38 and 39. If desired, the control piston 34 can be moved down to open the control valve by admitting pressure to the top of the control cylinder 33 by some manual means, as by opening the stopcock 40. The pipe 41 controlled by this stopcock may lead to another source of pressure, or it may be connected to the passageway 27 at the point shown closed by the plug 42. In either case, admission of pressure in the top of the control cylinder 33 opens the flow path to the top of the actuating cylinder 23, and this causes the piston and valve element to move to the position shown in Figure 2, the other parts in Figure 2 being shown in their positions which would result from automatic operation by the energizing of the solenoid 36.

The principal feature to which this application is directed is the shape of the piston 24 and the way in which it makes contact with the walls of its cooperating cylinder, and the way in which it is maintained in alignment in such cylinder during movement therein by its movable connection with the piston 18 carrying the valve member. As may be best seen in Figure 1, the metal piston body is more analogous to a disc than to a conventional piston, and it is cut away or chamfered at the edges so that the engagement between the piston body and the cylinder wall is practically a line engagement. That is, this engagement would be for a distance exceedingly small compared to the piston diameter, as for example $\frac{1}{16}$ inch for a piston about three inches in diameter. Moreover, there is sufficient spacing between the piston and the cylinder wall, several thousandths of an inch, that the axis of the piston can be shifted a little or angularly displaced without any jamming or wedging of the piston. Sealing is effected by independent means, here shown as a leather annulus or washer 43 carried by the piston. This is preferably of dry leather and of a diameter slightly larger than the internal diameter of the actuating cylinder, the leather being chamfered or angularly cut at its outer edge, so that when it is forced into the cylinder it is somewhat distorted to assume the position shown in the drawings. If desired, better sealing may be obtained by the use of two such flexible sealing elements, as the elements 44 and 45 shown in connection with the piston 46 in Figure 3.

The actuating cylinder 23, the opening 14, and the lower dashpot cylinder 19 are all coaxial, or at least as nearly so as is possible with commercial manufacturing tolerances. As a practical matter, however, these can never be exactly coaxial, and it is this factor which makes the line contact of the piston and the movable connection between the bottom of the rod 25 and the dashpot piston 18 so important. This latter movable connection is obtained by pointing the lower end of the rod 25, so that it is conically shaped; and by having it bear in a conical depression 47 in the dashpot piston 18. The angle of the depression 47 is greater than that of the point at the bottom end of the rod, as can be seen, so that there is no restriction to universal pivoting movement between these parts, at least to a limited extent. By having this as one point of guidance and the line contact between the piston and the cylinder wall spaced a substantial distance therefrom (preferably the rod element 25 should be longer than the diameter of the piston 24), what may be termed a "three-point" guidance of the piston is provided. With this arrangement any slight misalignment of the various parts causes no difficulty whatsoever, since even if the rod is several degrees off its proper angle the parts will all move with perfect freedom. Moreover, the reduced or line engagement between the actuating piston and its cooperating cylinder wall results in avoiding any collection of dirt or particles, and thus avoids scoring difficulties.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. A valve of the character described adapted to control fluid under pressure, including: a valve body having an inlet and an outlet and a partition separating them, the partition having an opening therethrough; a valve member adapted to control flow through the opening, said member being movable along the axis of said opening; an actuating cylinder coaxial with said opening; an actuating piston in said cylinder, said piston making substantially only a line contact with the cylinder wall; a guide cylinder coaxial with said opening; a guide piston in said cylinder, this piston carrying the valve member, the valve member having an opening therethrough; and a rod rigidly connected to the actuating piston at one end and movably connected to the guide piston at the other end, the rod having a length greater than the diameter of the actuating piston and passing through the opening in the valve member, and the movable connection between the rod and the guide piston comprising a point on one of these elements and a cooperating conical depression in the other element.

2. Apparatus of the character claimed in claim 1, wherein the valve member, the guide piston, and the cooperating end of the rod are so proportioned as to permit several degrees of movement between the rod and these other parts.

HENRY L. BEEKLEY.
ROLLIN H. LACART.